(12) United States Patent
Mori et al.

(10) Patent No.: US 8,448,625 B2
(45) Date of Patent: May 28, 2013

(54) METHOD OF PILOT INJECTION CONTROL AND SYSTEM THEREOF

(75) Inventors: Osamu Mori, Saitama (JP); Kazuhiko Hoshino, Saitama (JP)

(73) Assignee: Bosch Corporation, Tokyo (JP)

( * ) Notice: Subject to any disclaimer, the term of this patent is extended or adjusted under 35 U.S.C. 154(b) by 787 days.

(21) Appl. No.: 12/514,403

(22) PCT Filed: Nov. 6, 2007

(86) PCT No.: PCT/JP2007/071529
§ 371 (c)(1),
(2), (4) Date: Dec. 11, 2009

(87) PCT Pub. No.: WO2008/059730
PCT Pub. Date: May 22, 2008

(65) Prior Publication Data
US 2010/0139614 A1    Jun. 10, 2010

(30) Foreign Application Priority Data
Nov. 11, 2006    (JP) .................................. 2006-306071

(51) Int. Cl.
*F02B 3/00*    (2006.01)
*F02M 51/00*    (2006.01)

(52) U.S. Cl.
USPC ........................................ 123/299; 123/478

(58) Field of Classification Search
USPC ................. 123/299, 435, 456, 476, 478–480, 123/490; 701/103–105
See application file for complete search history.

(56) References Cited

U.S. PATENT DOCUMENTS

| | | | | |
|---|---|---|---|---|
| 6,354,274 B1* | 3/2002 | Shima et al. | | 123/478 |
| 6,412,469 B1* | 7/2002 | Itoyama et al. | | 123/299 |
| 6,694,945 B2* | 2/2004 | Kawaguchi et al. | | 123/299 |
| 6,748,920 B2* | 6/2004 | Ito et al. | | 123/299 |
| 6,814,059 B2* | 11/2004 | Ito et al. | | 123/464 |
| 6,877,479 B2* | 4/2005 | Miura | | 123/319 |
| 7,027,906 B2* | 4/2006 | Araki | | 701/104 |
| 7,337,767 B2* | 3/2008 | Magarida et al. | | 123/486 |
| 7,677,222 B2* | 3/2010 | Ishikawa | | 123/299 |
| 7,881,855 B2* | 2/2011 | Damitz et al. | | 701/104 |
| 2003/0233997 A1* | 12/2003 | Kawaguchi et al. | | 123/299 |
| 2004/0261414 A1* | 12/2004 | Araki | | 60/602 |
| 2004/0267433 A1* | 12/2004 | Asano et al. | | 701/104 |
| 2007/0131203 A1* | 6/2007 | Ohga | | 123/478 |
| 2008/0009999 A1* | 1/2008 | Sugiyama | | 701/103 |

FOREIGN PATENT DOCUMENTS

| | | |
|---|---|---|
| JP | 2003106192 A | 4/2003 |
| JP | 2003269229 A | 9/2003 |
| JP | 2005002904 A | 1/2005 |

\* cited by examiner

*Primary Examiner* — John Kwon
*Assistant Examiner* — Johnny Hoang
(74) *Attorney, Agent, or Firm* — Michael Best & Friedrich LLP

(57) ABSTRACT

A method of pilot injection control which avoids a change in the number of pilot injections in a transient response of an engine to improve driving and handling feeling. When pilot injection is performed, it is determined whether fuel injection amount Q immediately before the pilot injection is more than a maximum value Qmax and, if so, number of pilot injections is fixed to a predetermined value. When fuel injection amount Q is determined to be not more than the maximum value Qmax, it is determined whether fuel injection amount Q is lower than a minimum value Qmin, and, if so, the number-fixed control of the pilot injections is released and map control is started where the pilot injection number is determined based on a map.

4 Claims, 3 Drawing Sheets

METHOD OF PILOT INJECTION CONTROL AND SYSTEM THEREOF

BACKGROUND OF THE INVENTION

1. Field of the Invention

The present invention relates to pilot injection control of a diesel internal-combustion engine, and particularly relates to pilot injection control that may achieve suppression in torque variation in a transient response of engine rotational frequency.

2. Description of the Related Art

In a diesel internal-combustion engine, pilot injection is performed with multi injection in order to achieve mild combustion and thus reduce engine vibration during combustion, which has been a well-known technique in the past. Furthermore, such pilot multi-injection is effective for preventing misfire at low temperature, or improving fuel consumption. Therefore, the pilot multi-injection is currently widely used as disclosed, for example, in JP-A-2002-269229.

Typically, the pilot multi-injection control includes a method where a plurality of maps are prepared depending on external environment such as ambient temperature so that number of pilot injection is determined using fuel injection amount and engine rotational frequency as parameters, and one of the maps is selected depending on external environment during pilot injection, and number of pilot multi-injection is determined from fuel injection amount and engine rotational frequency at that time.

However, such so-called map control has a drawback that if number of pilot injection is changed in a transient response of engine rotational frequency, which may occur in the case of sudden depression of an accelerator, vibration in engine or variation in torque is induced. While such a drawback has been known in the past, most of pilot multi-injection control techniques are largely focused on reducing engine vibration during combustion, or on preventing misfire in an engine at low temperature. Therefore, a pilot multi-injection control technique giving full consideration to the above drawback is desired.

SUMMARY OF THE INVENTION

The invention was made in the light of the above circumstances, and provides a method of pilot injection control and a system thereof, which contributes to avoid change in number of pilot injection in a transient response of an engine, and thus enables improvement in driving feeling and travelling feeling.

According to a first embodiment of the invention, a pilot injection control method is provided, which controls pilot injection performed before main injection of fuel by fuel injection valves, the method being configured such that when fuel injection amount exceeds a predetermined maximum value, pilot multi-injection is performed with number being beforehand determined, and on the other hand, when fuel injection amount is lower than a predetermined minimum value, pilot multi-injection is performed with number being obtained by using a predetermined map for determining the number of pilot injection from engine rotational frequency and fuel injection amount.

According to a second embodiment of the invention, a fuel injection control system is provided, which has a plurality of fuel injection valves, and an electronic control unit for controlling operation of the fuel injection valves, and is configured to allow the fuel injection valves to perform main injection and pilot injection of fuel, wherein the electronic control unit is configured to be externally inputted with engine rotational frequency and temperature of engine cooling water, and the electronic control unit is configured to operate so that when pilot injection is performed by the fuel injection valves, whether fuel injection amount immediately before the pilot injection is more than a predetermined maximum value is determined, and in the case that the fuel injection amount is determined to be more than the predetermined maximum value, pilot multi-injection is performed with number being beforehand determined, and on the other hand, in the case that the fuel injection amount is determined to be not more than the predetermined maximum value, whether fuel injection amount is lower than a predetermined minimum value is determined, and in the case that the fuel injection amount is determined to be lower than the predetermined minimum value, number of pilot injection is determined by using a predetermined map, being beforehand stored, for determining the number of pilot injection from engine rotational frequency and fuel injection amount, and pilot multi-injection is performed with the determined number.

DETAILED DESCRIPTION OF THE PREFERRED EMBODIMENTS

Figure 1:
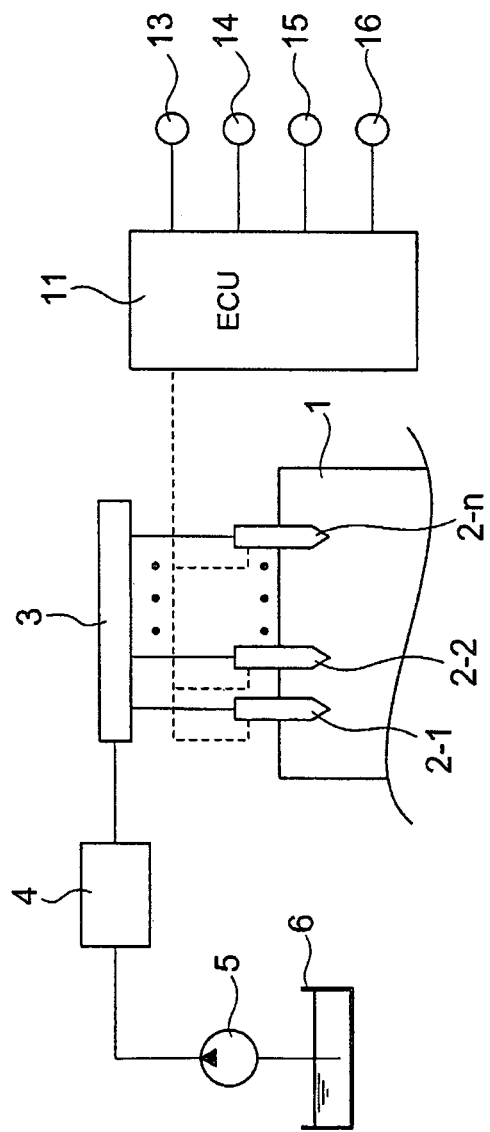
FIG. 1 is a block diagram showing a configuration example of a fuel injection control system of the embodiment of the invention.

Hereinafter, a preferred embodiment of the invention will be described with reference to FIGS. 1 to 3.

It will be noted that the members and arrangements described below are not intended to limit the present invention and can be variously modified within the scope of the gist of the present invention.

First, a configuration example of a fuel injection control system using a pilot injection control method of the embodiment of the invention is described with reference to FIG. 1.

As the fuel injection control system of the embodiment of the invention, a common-rail fuel injection control system is particularly configured.

The common-rail fuel injection control system is configured in a manner of being roughly divided into a plurality of fuel injection valves 2-1 to 2-n that inject fuel and supply the fuel to cylinders of a diesel engine 1 respectively; a common rail 3 that stores high-pressure fuel to be supplied to the fuel injection valves 2-1 to 2-n; a high-pressure pump 4 that feeds the high-pressure fuel under pressure to the common rail 3; a feed pump 5 that supplies fuel from a fuel tank 6 to the high-pressure pump 4; and an electronic control unit 11 that performs pilot injection control described later. Such a configuration itself is the same as a basic configuration of this type of fuel injection control system being well known in the past.

In such a configuration, fuel in the fuel tank 6 is drawn up into the high-pressure pump 4 by a feed pump 5, and the drawn-up fuel is fed under pressure as high-pressure fuel to the common rail 3 by the high-pressure pump 4. While being omitted to be shown, piping is provided to return surplus fuel in the common rail 3 to the fuel tank 6.

The fuel injection valves 2-1 to 2-n are provided for respective cylinders of the diesel engine 1, which are supplied with high-pressure fuel from the common rail 3, and perform pilot injection or main injection according to control by the electronic control unit 11 respectively.

The electronic control unit 11 is configured to have main components such as a microcomputer (not shown) having a well-known configuration as a core component, storage elements (not shown) such as RAM and ROM, and a drive circuit (not shown) for driving the fuel injection valves 2-1 to 2-n.

Such an electronic control unit 11 is inputted with detection signals to be used for engine operation control or injection control from various sensors such as a rotation sensor 13 for detecting engine rotational frequency, i.e. engine rotational speed, e.g., revolution per minute, an accelerator opening sensor 14 for detecting a degree of accelerator opening, an ambient temperature sensor 15 for detecting ambient temperature, and a water temperature sensor 16 for detecting temperature of cooling water of the diesel engine 1.

Figure 2:
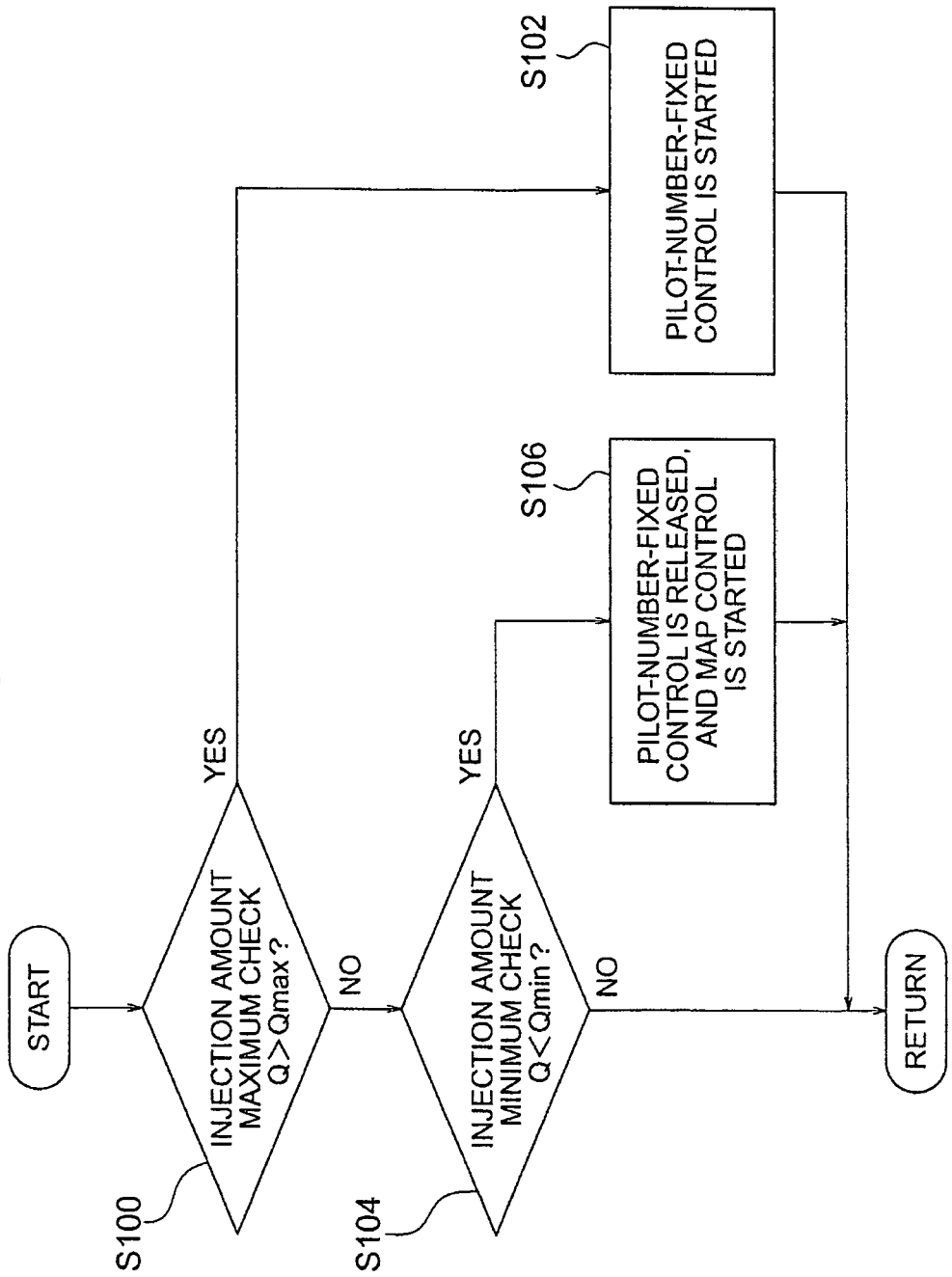
FIG. 2 is a subroutine flowchart showing a procedure of pilot injection control processing performed by an electronic control unit of the fuel injection control system shown in FIG. 1.

FIG. 2 shows a subroutine flowchart showing a procedure of pilot injection control processing performed by such an electronic control unit 11. Hereinafter, the pilot injection control processing in the embodiment of the invention is described with reference to the flowchart.

First, to describe summary of the pilot injection control processing in the embodiment of the invention, the pilot injection control is designed to perform pilot multi-injection in a manner of properly using, depending on a predetermined condition, control where number of pilot injection is fixed to a predetermined value, and a kind of map control where a map being beforehand set and stored is used to determine number of pilot multi-injection from engine rotational frequency and fuel injection amount.

Hereinafter, the pilot injection control processing is specifically described with reference to FIG. 2.

First, when the electronic control unit 11 starts processing to perform pilot injection, whether fuel injection amount Q immediately before the pilot injection exceeds a predetermined maximum value Qmax is determined (refer to step S100 in FIG. 2). In FIG. 2, such processing is mentioned as "INJECTION AMOUNT MAXIMUM CHECK" for convenience.

In the electronic control unit 11, a predetermined program as a main routine is executed for controlling fuel injection of the fuel injection valves 2-1 to 2-n in response to the subroutine processing shown in FIG. 2, and fuel injection amount is known through executing the program. Therefore, the known fuel injection amount data can be used as the fuel injection amount in the step S100.

The maximum value Qmax of the fuel injection amount Q is not a fixed value herein, and an optimum value thereof is successively calculated according to a predetermined computing equation depending on a predetermined condition such as engine rotational frequency or temperature of engine cooling water, that is, the maximum value is a dynamically determined value.

In the case that the fuel injection amount Q exceeds the maximum value Qmax (in the case of YES) in the step S100, processing proceeds to step S102 described subsequently, and on the other hand, in the case that the fuel injection amount Q does not exceed the maximum value Qmax (in the case of NO) in the step S100, processing proceeds to step S104 described later.

In the step S102, number-fixed control of pilot injection is started. A predetermined storage area of the electronic control unit 11 beforehand stores number of pilot multi-injection in the case that the fuel injection amount Q exceeds the maximum value Qmax, and in the step S102 or later, pilot multi-injection is performed with the stored number by the fuel injection valves 2-1 to 2-n.

Such a correlation between fuel injection amount Q exceeding the maximum value Qmax and number of pilot multi-injection, the correlation being stored in the predetermined storage area of the electronic control unit 11, is stored in a form of a table in the predetermined storage area of the electronic control unit 11 in the embodiment of the invention.

On the other hand, in the step S104, whether fuel injection amount Q is lower than a minimum value Qmin is determined. From the viewpoint of securing stability of operation, the minimum value Qmin of the fuel injection amount Q has a sense of so-called hysteresis to the maximum value Qmax, and a specific value thereof is preferably determined based on an experimental result, a simulation result and the like in the light of difference in stability of operation between individual vehicles or the like.

In the step S104, when fuel injection amount Q is determined to be lower than the minimum value Qmin (in the case of YES), the number-fixed control of pilot multi-injection described in the step S102 is released (refer to step S106 in FIG. 2).

Thus, after that, number of pilot multi-injection is determined based on a map stored in a predetermined storage area of the electronic control unit 11.

Figure 3:
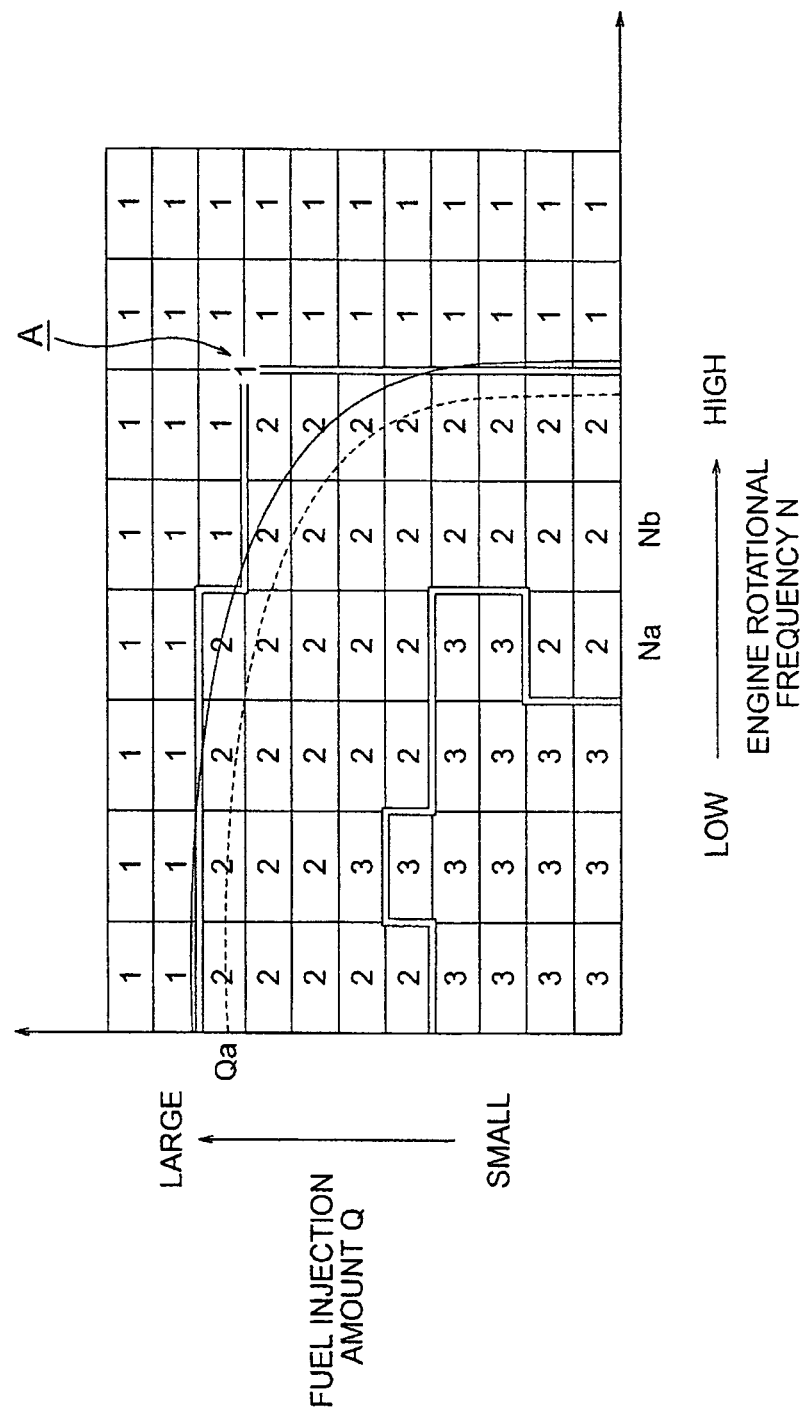
FIG. 3 is an explanatory diagram illustrating an example of a map for determining the number of pilot injection from engine rotational frequency and fuel injection amount.

FIG. 3 shows an example of a map for determining pilot number in the embodiment of the invention, which is described below.

In the map shown in FIG. 3, pilot injection number is obtained from engine rotational frequency and fuel injection amount, and each numerical value in the map shows the pilot injection number. The respective numerical values in the map are merely shown as an example, and specifically appropriate values should be individually set based on a result of an experiment or simulation from a viewpoint of preventing misfire or the like while considering the scale of the diesel engine 1 or body size of a vehicle.

In FIG. 3, a curve shown by a solid line shows an example of change in the maximum value Qmax, and a curve shown by a dotted line shows an example of change in the minimum value Qmin.

To newly describe the step S102 with reference to the figure, the step S102 is performed on the assumption that fuel injection amount Q exceeds the maximum value Qmax. That is, in the example shown in FIG. 3, the step is performed on the assumption that fuel injection amount Q is above the curve of the solid line showing the maximum value Qmax of the fuel injection amount Q. In this case, number of pilot injection is fixed to "1". In FIG. 3, a numerical value of "1" marked with a symbol A shows number of pilot injection in number-fixed control performed through execution of the step S102.

Therefore, in the prior method where number of pilot injection is determined only by a map, the number is determined as follows. For example, in FIG. 3, when engine rotational frequency is Na, and fuel injection amount is Qa at a particular point, "2" is selected as number of pilot injection, and pilot injection is performed with the selected number. However, if the engine rotational frequency is changed to Nb during that, "1" is newly selected as number of pilot injection, and thus number of pilot injection is changed. However, in the case that engine rotational frequency is transiently increased due to temporal depression of an accelerator (not shown) or the like, change in number of pilot injection may be undesirable, which has not been able to be avoided in the prior method.

For example, in the map shown in FIG. 3, in the case that engine rotational frequency is transiently changed near a boundary between pilot number "2" and pilot number "1", and along with this, number of pilot injection is changed according to the map of FIG. 3, vibration in the diesel engine 1 or variation in torque temporally occurs, which has sometimes caused a driver to feel reduction in driving feeling or travelling feeling.

On the other hand, in the embodiment of the invention, in the case that fuel injection amount Q exceeds the maximum value Qmax at a boundary portion of pilot injection number in a map, at which the pilot injection number may be changed as in the example, the pilot injection number is fixed to a predetermined pilot injection number. Therefore, unprepared change in pilot injection number may be avoided, resulting in stable pilot injection.

When the step S106 is performed, that is, in a condition that fuel injection amount Q is below the curve shown by the dotted line in the example shown in FIG. 3, in other words, in a condition that the fuel injection amount Q is lower than the minimum value Qmin, pilot injection is performed with number being determined according to the map shown in FIG. 3 based on engine rotational frequency and fuel injection amount in each case.

To return to description of FIG. 2, in the case that fuel injection amount Q is determined to be not lower than the minimum value Qmin (in the case of NO), in other words, in the case that fuel injection amount Q is more than the minimum value Qmin, and lower than the maximum value Qmax, a state is kept, in which pilot injection is performed with number being most recently selected.

That is, the subroutine processing is repeatedly performed with a predetermined period determined by a not-shown main routine, and in the case that fuel injection amount Q is more than the maximum value Qmax in subroutine processing performed most recently, and fuel injection amount Q is lower than the maximum value Qmax, and more than the minimum value Qmin in subsequent subroutine processing, and therefore determination is made as NO in the step S104, number-fixed control (refer to step S102 in FIG. 2) is kept.

On the other hand, for example, in a condition that fuel injection amount Q is lower than the minimum value Qmin, and the pilot-number-fixed control is released (refer to step S106 in FIG. 2) in subroutine processing performed most recently, when the fuel injection amount Q is determined to be not lower than the minimum value Qmin in subsequent subroutine processing (refer to step S104 in FIG. 2), a state where the pilot-number-fixed control is released, in other words, a state where pilot number is controlled based on the map is kept.

In this way, in the case that fuel injection amount is equal to or less than the predetermined amount, pilot number is controlled based on the map. Thus, setting of pilot injection number may be made at a desired point (singular point) while considering a particular condition such as misfire, and consequently smooth injection control can be achieved at a singular point at which number-fixed control may not meet such injection control.

In the configuration example, pilot injection control in the common-rail fuel injection control system was described. However, a configuration of the fuel injection control system need not be limited to the common rail type, and the invention may be similarly applied to a fuel injection control system having a different configuration.

As described hereinbefore, according to the fuel injection control system according to the invention, unprepared change in pilot injection number may be avoided, and consequently stable fuel injection control may be secured. Therefore, the system is particularly suitable for a fuel injection control system having a pilot injection function.

According to the invention, in the case that engine rotational frequency is transiently changed, change in number of pilot injection can be avoided in an area where change in number of pilot injection tends to occur, which may suppress vibration in engine or variation in torque due to unprepared change in number of pilot injection, and consequently driving feeling may be advantageously improved.

What is claimed is:

1. A pilot injection control method controlling pilot injection performed before main injection of fuel by fuel injection valves, comprising the steps of:
   when a fuel injection amount exceeds a predetermined maximum value, performing pilot multi-injection with a number of pilot injection being fixed at one until the fuel injection amount is lower than a predetermined minimum value; and
   performing pilot multi-injection with the number of pilot injection being obtained by using a predetermined map for determining the number of pilot injection from engine rotational speed and fuel injection amount when fuel injection amount is lower than the predetermined minimum value.

2. The pilot injection control method according to claim 1, wherein the predetermined maximum value is successively set based on at least engine rotational speed and temperature of engine cooling water.

3. A fuel injection control system, comprising:
   a plurality of fuel injection valves; and
   an electronic control unit for controlling operation of the fuel injection valves, which is configured to allow the fuel injection valves to perform main injection and pilot injection of fuel; wherein
   the electronic control unit is configured for externally inputting engine rotational speed and temperature of engine cooling water, and for operating such that when pilot injection is performed by the fuel injection valves, whether a fuel injection amount immediately before the pilot injection is more than a predetermined maximum value is determined, and in the case that the fuel injection amount is determined to be more than the predetermined maximum value, pilot multi-injection is performed with a number of pilot injection being fixed at one until the fuel injection amount is lower than a predetermined minimum value, and in the case that the fuel injection amount is determined to be not more than the predetermined maximum value, whether the fuel injection amount is lower than the predetermined minimum value is determined, and in the case that the fuel injection amount is determined to be lower than the predetermined minimum value, the number of pilot injection is determined by using a predetermined map, being beforehand stored, for determining the number of pilot injection from engine rotational speed and fuel injection amount, and pilot multi-injection is performed with the determined number of pilot injection.

4. The fuel injection control system according to claim 3, wherein the electronic control unit is for successively setting the predetermined maximum value based on at least engine rotational speed and temperature of engine cooling water.

* * * * *